United States Patent
McCann et al.

(10) Patent No.: US 12,403,930 B2
(45) Date of Patent: Sep. 2, 2025

(54) SYSTEMS AND METHODS FOR DETECTING AND WARNING DRIVERS OF VULNERABLE ROAD USERS

(71) Applicant: GM GLOBAL TECHNOLOGY OPERATIONS LLC, Detroit, MI (US)

(72) Inventors: Morgan Lee McCann, Troy, MI (US); Steffen Peter Lindenthal, Oshawa (CA); Norman J. Weigert, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 123 days.

(21) Appl. No.: 18/448,378

(22) Filed: Aug. 11, 2023

(65) Prior Publication Data
US 2025/0050902 A1    Feb. 13, 2025

(51) Int. Cl.
*B60Q 1/00* (2006.01)
*B60Q 1/04* (2006.01)
*B60Q 1/50* (2006.01)
*B60W 50/16* (2020.01)

(52) U.S. Cl.
CPC .............. *B60W 50/16* (2013.01); *B60Q 1/04* (2013.01); *B60Q 1/525* (2013.01)

(58) Field of Classification Search
CPC .......... B60W 50/16; B60Q 1/04; B60Q 1/525
See application file for complete search history.

(56) References Cited

U.S. PATENT DOCUMENTS

| | | | | |
|---|---|---|---|---|
| 9,369,680 B2* | 6/2016 | Teller | ..................... | G03B 21/00 |
| 9,758,085 B2* | 9/2017 | Bengtsson | ............. | B60Q 1/085 |
| 9,789,808 B1* | 10/2017 | Hong | ..................... | B60Q 1/143 |
| 11,332,063 B2* | 5/2022 | Fujiyama | ................. | H04N 5/33 |
| 11,634,065 B2* | 4/2023 | Hasegawa | ............. | B60Q 1/085 |
| | | | | 315/82 |

FOREIGN PATENT DOCUMENTS

| | | |
|---|---|---|
| DE | 102009051485 A1 | 6/2010 |
| DE | 102009002979 A1 | 11/2010 |
| DE | 102011102759 A1 | 1/2012 |
| DE | 102010043212 A1 | 5/2012 |
| DE | 102016001692 A1 | 8/2017 |

OTHER PUBLICATIONS

Office Action dated Feb. 22, 2024 from German Patent Office for German Patent No. 10 2023 132 929.4; 7pgs.

* cited by examiner

*Primary Examiner* — Toan N Pham

(57) ABSTRACT

A system includes a detection module and a control module in communication with the detection module. The detection module includes at least one sensor configured to detect vulnerable road users (VRUs) on or adjacent to a road. The control module is configured to receive data indicative of a detected VRU, determine a location of the detected VRU relative to the vehicle based on the received data, and in response to determining the location of the detected VRU, temporarily flicker an intensity of light output from a first active headlight on a driver side of the vehicle and/or a second active headlight on a passenger side of the vehicle to warn the driver of the location of the detected VRU relative to the vehicle. Other example systems and methods are also disclosed.

20 Claims, 6 Drawing Sheets

SYSTEMS AND METHODS FOR DETECTING AND WARNING DRIVERS OF VULNERABLE ROAD USERS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for detecting and warning drivers of vulnerable road users.

A vehicle may include a driver assistance system that relies on sensors for blind spot detection, adaptive cruise control, lane departure warnings, etc. In some cases, the driver assistance system may detect an object at a short distance from the vehicle, and then activate a dedicated spotlight in a fog light to highlight and track the object as the vehicle moves.

SUMMARY

A system is disclosed for warning a driver in a vehicle of a vulnerable road user (VRU) while the vehicle is moving. The system includes a detection module and a control module in communication with the detection module. The detection module includes at least one sensor configured to detect VRUs on or adjacent to a road on which the vehicle is moving. The control module is configured to receive data indicative of a detected VRU, determine a location of the detected VRU relative to the vehicle based on the received data, the location including a driver side or a passenger side of the vehicle, and in response to determining the location of the detected VRU, temporarily flicker an intensity of light output from at least one of a first active headlight on the driver side of the vehicle and a second active headlight on the passenger side of the vehicle to warn the driver of the location of the detected VRU relative to the vehicle.

In other features, the at least one sensor includes at least one of a radar, an infrared camera, an infrared sensor, a visible light sensor, and a gated short wave infrared sensor.

In other features, the at least one sensor is configured to detect the VRU beyond a maximum range of the first active headlight and the second active headlight.

In other features, the control module is configured to determine a confidence value of the detected VRU, and temporarily flicker the intensity of light output from the first active headlight on the driver side or the second active headlight on the passenger side only if the determined confidence value is greater than a confidence threshold.

In other features, the control module is configured to receive data indicative of a likelihood of animal presence, and adjust the confidence threshold based on the likelihood of animal presence.

In other features, the control module is configured to detect whether the driver is looking in the direction of the detected VRU, and temporarily flicker the intensity of light output from the first active headlight on the driver side or the second active headlight on the passenger side only if the driver is not looking in the direction of the detected VRU.

In other features, the control module is configured to detect whether oncoming vehicle traffic is present, and temporarily flicker the intensity of light output from the first active headlight on the driver side or the second active headlight on the passenger side only if no oncoming vehicle traffic is present.

In other features, the control module is configured to receive data indicative of a visibility condition adjacent to the vehicle and a velocity of the vehicle, and temporarily flicker the intensity of light output from the first active headlight on the driver side or the second active headlight on the passenger side of the vehicle only if the visibility condition is below a visibility threshold and the velocity of the vehicle is above a velocity threshold.

In other features, the control module is configured to, in response to determining the location of the detected VRU, activate a directional alert in the vehicle to warn the driver of the location of the detected VRU relative to the vehicle.

In other features, the directional alert includes at least one of a visual alert, a haptic alert, and an audible alert.

In other features, the first active headlight and the second active headlight are high beam headlights.

A method for warning a driver in a vehicle of a VRU is disclosed. The method includes detecting, with at least one sensor, a VRU on or adjacent to a road on which the vehicle is moving, determining a location of the detected VRU relative to the vehicle, the location including a driver side or a passenger side of the vehicle, and in response to determining the location of the detected VRU, temporarily flickering an intensity of light output from at least one of a first active headlight on the driver side of the vehicle and a second active headlight on the passenger side of the vehicle to warn the driver of the location of the detected VRU relative to the vehicle.

In other features, the method further includes determining a confidence value of the detected VRU.

In other features, temporarily flickering the intensity of light output includes temporarily flickering the intensity of light output from the first active headlight on the driver side or the second active headlight on the passenger side only if the determined confidence value is above a confidence threshold.

In other features, the method further includes receiving data indicative of a likelihood of animal presence, the data including at least one of the location of the road on which the vehicle is moving, the time of day, and the season of the year, and adjusting the confidence threshold based on the likelihood of animal presence.

In other features, temporarily flickering the intensity of light output includes temporarily flickering the intensity of light output from the first active headlight on the driver side or the second active headlight on the passenger side of the vehicle only if the driver is not looking in the direction of the detected VRU and oncoming vehicle traffic is not detected.

In other features, the method further includes receiving data indicative of a visibility condition adjacent to the vehicle and a velocity of the vehicle.

In other features, temporarily flickering the intensity of light output includes temporarily flickering the intensity of light output from the first active headlight on the driver side or the second active headlight on the passenger side only if the visibility condition is below a visibility threshold and the velocity of the vehicle is above a velocity threshold.

In other features, the method further includes activating a directional alert in the vehicle to warn the driver of the location of the detected VRU relative to the vehicle in response to determining the location of the detected VRU.

In other features, the directional alert includes at least one of a visual alert, a haptic alert, and an audible alert.

In other features, the at least one sensor includes at least one of a radar, an infrared camera, an infrared sensor, a visible light sensor, and a gated short wave infrared sensor.

In other features, the first active headlight and the second active headlight are high beam headlights.

A system is disclosed for warning a driver in a vehicle of a VRU while the vehicle is moving on a road. The vehicle includes at least one first active headlight on a driver side of the vehicle and at least one second active headlight on a passenger side of the vehicle. The system includes a detection module and a control module in communication with the detection module. The detection module includes at least one sensor configured to detect VRUs on or adjacent to the road that is beyond a maximum range of the first active headlight and the second active headlight. The control module is configured to receive data indicative of a detected VRU, receive data indicative of a visibility condition adjacent to the vehicle and a velocity of the vehicle, determine a location of the detected VRU relative to the vehicle based on the received data, the location including a driver side or a passenger side of the vehicle, and in response to determining the location of the detected VRU, temporarily flicker an intensity of light output from the first active headlight on the driver side of the vehicle or the second active headlight on the passenger side of the vehicle to warn the driver of the location of the detected VRU relative to the vehicle only if the visibility condition is below a visibility threshold and the velocity of the vehicle is above a velocity threshold.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A moving vehicle often encounters objects on or near a road, such as a vulnerable road user (VRU). Often, a driver of the vehicle is unaware of the VRU (e.g., an individual/human of any size and/or shape, an animal of medium to large size, etc.) and/or recognizes the VRU with minimal time to react. This may occur in various conditions. For example, accidents involving VRUs often occur in low-light, low-visibility conditions while driving on predominantly straight, rural roads at higher speeds (e.g., greater than 60 kph, etc.). Such conditions result in thousands of fatal accidents every year. In many cases, the number of accidents and/or the impact of the accidents could have been reduced, had the driver been aware of the upcoming VRU earlier.

The systems and methods according to the present disclosure provide accurate detection of a VRU on or adjacent to a road and advanced warning of the VRU to a driver of a vehicle moving along the road by temporarily flickering or adjusting the light intensity of select active headlights in the vehicle. In various embodiments, the systems and methods herein detect the VRU with one or more sensors with an acceptable range for the vehicle's configuration. Example sensors may include a radar (e.g., a long-range radar), an infrared camera (e.g., a long range long wave infrared camera), an infrared sensor (e.g., a long range gated near infrared sensor), a visible light sensor, a gated short wave infrared sensor, etc. that may be able to detect the VRU beyond a maximum range of the headlights and in some cases, beyond a visibility range of the driver (e.g., invisible to the driver). Then, once detected, the systems and methods may alert the driver of the VRU by temporarily flicker or adjusting the light intensity of one of the active headlights (e.g., a headlight actively providing light) on the side of the vehicle that is closest to where the VRU was detected. In this manner, the driver may be alerted of the VRU and its location relative to the vehicle in advance of being visible by the driver and/or within range of the headlights, by utilizing, for example, existing base trim hardware (e.g., headlights, control modules, etc.). As such, the driver may take actions (e.g., safely maneuvering around the upcoming VRU, etc.) in response to the advanced alert, thereby decreasing the chance of an accident.

Figure 1:
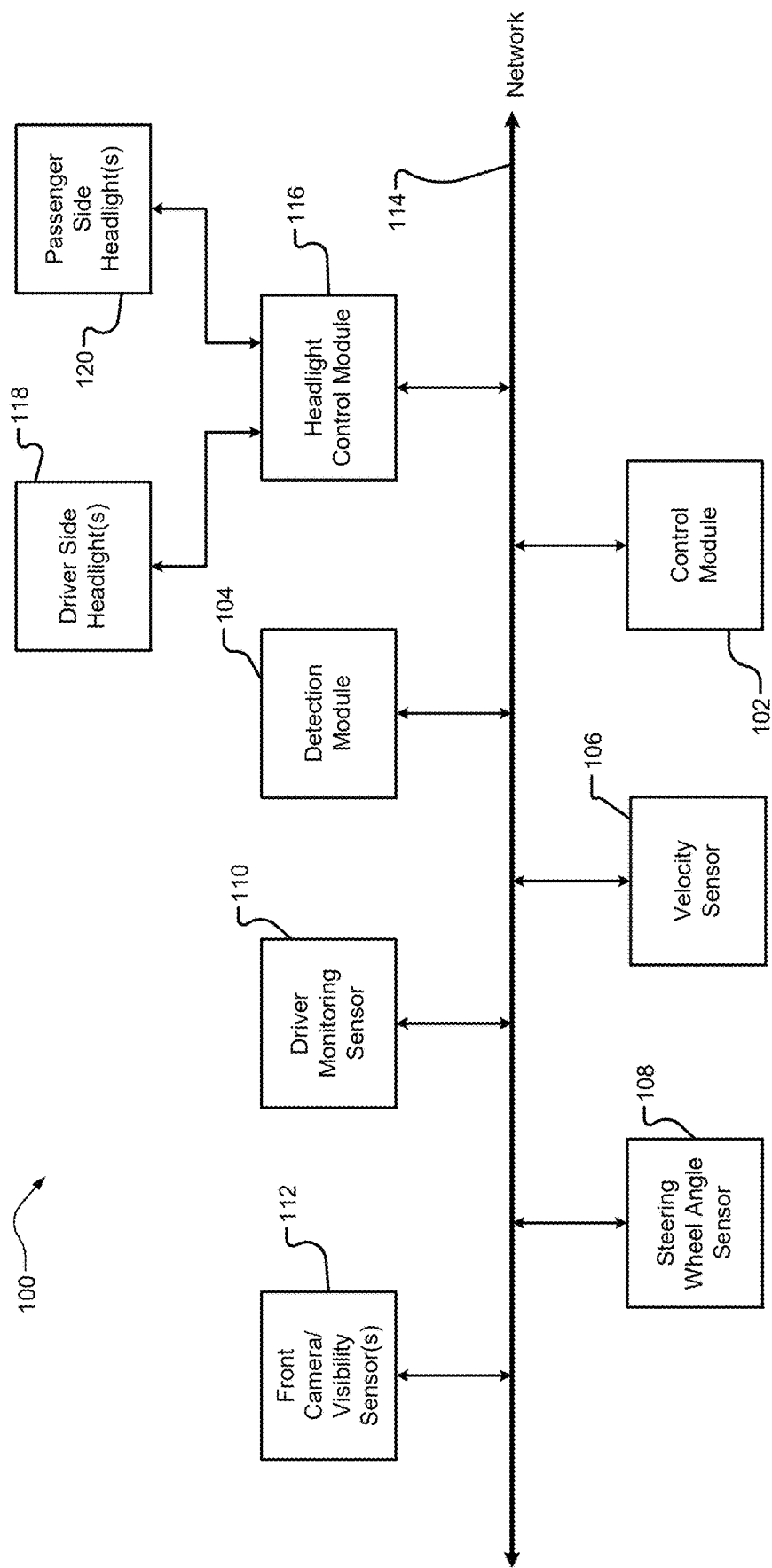
FIG. 1 is a functional block diagram of an example system for detecting and warning a driver of a vulnerable road user according to the present disclosure.

Referring now to FIG. 1, a block diagram of an example system 100 is presented for detecting and warning a driver in a vehicle of a VRU while the vehicle is moving. The system 100 of FIG. 1 may be employable in any suitable vehicle, such as an electric vehicle (e.g., a pure electric vehicle, a plug-in hybrid electric vehicle, etc.), an internal combustion engine vehicle, etc. Additionally, the system 100 may be applicable to an autonomous vehicle, a semi-autonomous vehicle, or a non-autonomous vehicle. Further, the vehicle may include, for example, a car, an SUV, a truck, etc.

As shown in FIG. 1, the system 100 generally includes a control module 102, a detection module 104 in communication with the control module 102, and one or more sensors in communication with the control module 102. In the example of FIG. 1, the one or more sensors include a velocity sensor 106, a steering wheel angle sensor 108, a driver monitoring sensor 110, and one or more visibility sensors 112. Although FIG. 1 illustrates the system 100 as including specific sensors, it should be appreciated that one or more other sensors may be employed if desired.

The modules and sensors of the system 100 may share parameters via a network 114, such as a controller (or car) area network (CAN). In such examples, the parameters may be shared via one or more data buses of the network 114. As such, various parameters may be made available by a given module and/or sensor to other modules and/or sensors via the network 114.

With continued reference to FIG. 1, the system 100 may further include a headlight control module 116 in communication with the control module 102 via the network 114. In such examples, the headlight control module 116 may be a dedicated component external to the control module 102 as shown in FIG. 1. In other examples, the headlight control module 116 may be integrated within the control module 102 and/or eliminated if the control module 102 performs the functions of the headlight control module 116. Regardless of the configuration, the headlight control module 116 and/or the control module 102 may control a driver side headlight 118 and a passenger side headlight 120 of the vehicle, as further explained herein. The headlights 118, 120 include static headlights, such as high beam headlights, low beam headlights, fog lights, light bars, etc. In such examples, each static headlight may include one or more lights.

The velocity sensor 106 monitors the speed (e.g., miles per hours, kilometers per hour, etc.) of the vehicle. For example, the velocity sensor 106 may include a vehicle speed sensor (VSS) that measures a transmission/transaxle output or wheel speed. The velocity sensor 106 may then provide data (e.g., via a signal) indicative of the vehicle velocity to the control module 102 and/or another control module in the vehicle. In other examples, the control module 102 may receive data representing an accelerator pedal position of the vehicle. In such examples, the control module 102 may determine or calculate the velocity of the vehicle based on the accelerator pedal position.

The steering wheel angle sensor 108 monitors a rotational position, movement, etc. of a steering wheel and generates a signal based on the position, movement, etc. of the steering wheel. The generated signal may then be provided to the control module 102 and/or another control module (e.g., a steering control module) in the vehicle. As an example, the steering control module may control vehicle steering via an electronic power steering (EPS) motor based on the generated signal. However, the vehicle may include another type of steering system. The steering control module and/or the EPS motor may then provide the signal to the control module 102.

In various embodiments, the monitored position, movement, etc. of the steering wheel may be used by the control module 102 to determine a curvature of the road in which the vehicle is traveling. For example, such data may be used to determine whether the vehicle is traveling along a relatively straight or curvy road (or along relatively straight portions or curved portions of the road). In other examples, such determinations may be made through other sensors and/or modules. For example, the control module 102 may determine whether the vehicle is traveling along a relatively straight or curvy road based on a mapping system (e.g., a GPS, etc.) in communication with the control module 102.

The driver monitoring sensor 110 monitors the driver of the vehicle. For example, the driver monitoring sensor 110 may be a component of a driver monitor system. In such examples, the driver monitoring sensor 110 captures data of the driver and provides the data to, for example, the control module 102 and/or another suitable control module in the system 100. The data may be analyzed by the control module 102 (and/or another a control module in the driver monitor system) to determine the driver is looking in a particular direction, such as in the direction of the detected VRU (as further explained below). In some examples, the driver monitoring sensor 110 includes one or more cameras positioned in the vehicle (e.g., in a steering column, in an entertainment center adjacent to the driver, etc.) and directed towards the driver.

The one or more visibility sensors 112 of FIG. 1 monitor an area around vehicle for visibility conditions. For example, the visibility sensors 112 may include a front camera module and/or another suitable device for detecting objects and/or capturing data indicative of a visibility condition adjacent to the vehicle. In such examples, the visibility sensors 112 may detect low-visibility conditions, such as fog, smoke, rain, snow, darkness, etc. In some embodiments, the visibility sensors 112 may additionally or alternatively include a precipitation sensor, a light detection sensor, and/or other sensors to detect low-visibility conditions. For example, the precipitation sensor may detect rain, snow, etc. and the light detection sensor may detect a darkness. Regardless of the devices employed, the visibility sensors 112 may collect data indicative of a visibility condition adjacent to the vehicle and provide the data to the control module 102 and/or another suitable control module in the system 100.

In the example of FIG. 1, the detection module 104 detects a VRU on or adjacent to a road on which the vehicle is moving and provides data indicative of the detected VRU to the control module 102 and/or another suitable control module in the system 100. For example, the detection module 104 may include one or more detection devices mounted on the vehicle. During operation, a detection device of the detection module 104 may emit waves (e.g., light waves, ultrasonic sound waves, microwave signals, etc.) and then receive reflected waves to detect objects. In some examples, the detection module 104 may detect a VRU about 100 meters, about 130 meters, etc. away from the vehicle depending on, for example, the type of detection device(s) employed. In such examples, the detection module 104 may detect the VRU beyond a maximum range of vehicle headlights. For instance, high beam headlights may range up to about 20 meters.

In various embodiments, the detection module 104 may include, for example, one or more sensors capable of detecting the VRU beyond a maximum range of the headlights. In some examples, the sensors may include a radar (e.g., a long range radar), an infrared camera (e.g., a long range long wave infrared camera), an infrared sensor (e.g., a long range gated near infrared sensor), a visible light sensor, a gated short wave infrared sensor, etc. Such devices may generally detect the VRU by detecting radiated heat associated with the objects. In other examples, the detection module 104 may include another suitable device for detecting the VRU if desired.

Figure 2:
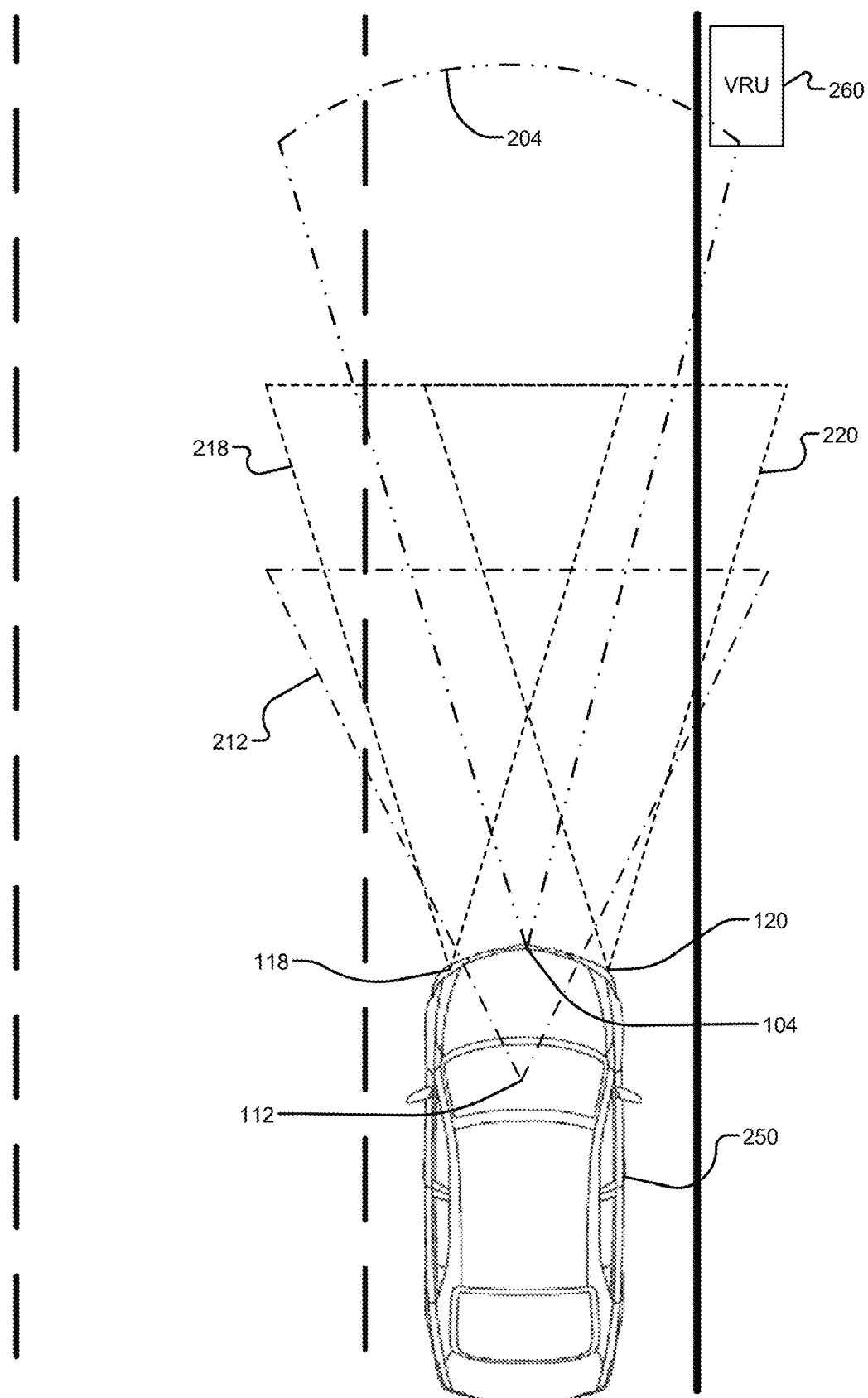
FIG. 2 is a functional block diagram of a vehicle including a system for detecting and warning a driver of a vulnerable road user according to the present disclosure.

For example, FIG. 2 depicts a vehicle 250 including the detection module 104, the driver side headlight 118, the passenger side headlight 120, and the visibility sensor 112 of FIG. 1. In the example of FIG. 2, the headlights 118, 120 are high beam headlights having light ranges depicted by overlapping regions 218, 220 (indicated by lines having a dash-dash configuration). Additionally, the visibility sensor 112 may be, for example, a front camera module and/or another suitable device for detecting objects and/or capturing data indicative of a visibility condition adjacent to the vehicle 250. In the example of FIG. 2, the visibility sensor 112 has a range depicted by a region 212 (indicated by lines having a dash-dot-dash configuration). The detection module 104 (e.g., a long wavelength infrared device, etc.) of FIG. 2 has a detection range depicted by a region 204 (indicated by lines having a dash-dot-dot-dash configuration).

As shown, the detection range of the detection module 104 extends beyond the light ranges of the headlights 118, 120, and into a VRU 260 positioned on a side of the road. In this manner, the detection module 104 detects the VRU 260 in advance of the headlights 118, 120 illuminating the VRU 260 and/or the front camera module detecting the VRU 260 as the vehicle 250 travels along the road.

With continued reference to FIG. 1, the control module 102 or the detection module 104 determines a location of the detected VRU relative to the vehicle based on the data from the detection module 104. For example, the control module 102 may receive data of an angle of the reflected waves from the VRU (e.g., the VRU 260 of FIG. 2) received by the detection module 104 relative to the vehicle. In such examples, the control module 102 can determine whether the detected VRU is on a driver side of the vehicle or a passenger side of the vehicle based on the angle of the reflected waves relative to the vehicle (e.g., a direction of travel of the vehicle). In other examples, the detection module 104 may make a similar determination and then provide the location of the detected VRU to the control module 102.

Then, the control module 102 can temporarily flicker (e.g., adjust, etc.) an intensity of light output from the driver side headlight 118 or the passenger side headlight 120 in response to the determined location of the detected VRU. For example, once the location of the detected VRU is known, the control module 102 can adjust the light intensity of the headlight 118, 120 on the side of the vehicle that is closest to where the VRU was detected. For instance, if the VRU is detected on the driver side of the vehicle, the control module 102 adjusts the light intensity of the driver side headlight 118. If, however, the VRU is detected on the passenger side of the vehicle, the control module 102 adjusts the light intensity of the passenger side headlight 120. In such examples, the adjustment of the light intensity of the particular headlight 118, 120 on the side of the vehicle that is closest to where the VRU was detected effectively warns the driver of, not only the VRU, but also the location of the VRU relative to the vehicle.

In various embodiments, the headlights 118, 120 include static headlights, such as high beam headlights. In such examples, the control module 102 may temporarily flicker the light intensity of the headlights 118, 120 by interrupting power to the headlights 118, 120 thereby causing the light intensity of the headlights to change. For example, the headlights 118, 120 may flicker on and off at a sufficient frequency (e.g., 1/30 sec, etc.) to cause the headlights 118, 120 to appear as if they are momentarily reducing light intensity without highlighting the VRU. This may be repeated over a period of time to visually alert the driver of the VRU. In such examples, the overall light intensity from the vehicle is reduced through static headlights (which are used for other purposes) to alert the driver of the VRU as compared to conventional systems that add light intensity with dedicated spotlights to highlight and track the object as the vehicle moves. As such, the adjustment of light intensity of the static headlights provides an energy efficient manner of alerting the driver of the VRU even during low visibility conditions (e.g., during rainy/wet conditions).

In some examples, the control module 102 may temporarily flicker (e.g., adjust, etc.) the light intensity of both headlights 118, 120. For example, the VRU may be located in a middle region of a road lane the vehicle traveling along. In such examples, once the VRU is detected and the location of the VRU is determined, the control module 102 may decrease the light intensity of both headlights 118, 120 as explained above. For instance, the area in front of the moving vehicle may be separated into three or more regions. For example, the regions may include a driver side region covering an area in front of the moving vehicle on the driver side, a passenger side region covering an area in front of the moving vehicle on the passenger side, and an intermediate region between the driver side region and the passenger side region. When the VRU is determined to be in the driver side region or the passenger side region, the control module 102 may adjust the light intensity of the driver side headlight 118 or the passenger side headlight 120 as explained above. However, when the VRU is determined to be in the intermediate region, the control module 102 may adjust the light intensity of both headlights 118, 120. In such examples, the intermediate region may be defined by an offset (e.g., a half of a meter, one meter, etc.) on each side of a centerline of the vehicle.

In various embodiments, the control module 102 may suppress or prevent the adjustment of the light intensity if one or more conditions are met. In other words, the control module 102 may adjust the light intensity of one or both headlights 118, 120 only if certain condition(s) apply. Otherwise, the light intensity of one or both headlights 118, 120 is maintained (e.g., not adjusted). Such conditions may be, for example, environmental conditions based on the visibility, characteristics of the road, the location of the road, characteristics of the vehicle, characteristics of the driver, etc. For example, and as further explained herein, the control module 102 may adjust the light intensity of the headlights 118, 120 and/or the detection module 104 may be active (e.g., to detect a VRU) only during low-light/low-visibility conditions when the vehicle is driven straight on a rural road at high speeds and when the driver has not yet looked in the direction of the VRU. With such optional conditions, the system 100 may minimize unnecessary alerts and in turn unnecessary distractions for the driver.

For example, the control module 102 may maintain (e.g., not adjust) the light intensity of the headlights 118, 120 based on data from the driver monitoring sensor 110. For instance, the control module 102 may detect whether the driver is looking in the direction of the detected VRU based on the data from the driver monitoring sensor 110. This detection may be based on the head position of the driver relative to the detected VRU. If the driver is looking in the direction of the detected VRU (e.g., for a defined period of time, etc.), the control module 102 may maintain the light intensity of the headlights 118, 120. In other words, the light intensity of the headlights 118, 120 may be adjusted only if the driver is not looking in the direction of the detected VRU.

Additionally, the control module 102 may maintain the light intensity of the headlights 118, 120 based on data from the visibility sensor(s) 112. For example, one of the visibility sensors 112 (e.g., a front camera module, etc.) may detect the presence of oncoming vehicle traffic. In response to detecting the oncoming vehicle traffic, the control module 102 may maintain the light intensity of the headlights 118, 120. As such, the light intensity of the headlights 118, 120 may be adjusted only if no oncoming vehicle traffic is present.

In other examples, one or more of the visibility sensors 112 may detect low-visibility conditions as explained above. In such examples, the control module 102 may receive data indicative of a visibility condition adjacent to the vehicle. The visibility condition may be affected based on a darkness level, rain, snow, smoke, fog, etc. as detected by the visibility sensor(s) 112 as explained above. In some examples, the control module 102 may then assign a value representing the visibility condition. For example, a lower value may indicate poor visibility while a higher value may indicate acceptable visibility. Then, the control module 102 may adjust the light intensity of the headlights 118, 120 only if the visibility condition (e.g., the assigned value) is below a visibility threshold.

In various embodiments, the control module 102 may adjust the light intensity of the headlights 118, 120 only if the vehicle is traveling at sufficiently high speed. For example, the control module 102 may receive data indicative of a velocity of the vehicle from the velocity sensor 106 as explained above. In such examples, the control module 102 may adjust the light intensity of the headlights 118, 120 only if the velocity of the vehicle is above a velocity threshold. In such examples, the velocity threshold may be a set value (e.g., 60 kph, 65 kph, 70 kph, 80 kph, 90 kph, etc.). In other examples, the velocity threshold may vary depending on, for example, characteristics of the road, the location of the road (e.g., rural, in a city, etc.), the time of day, the season (e.g., fall, summer, etc.), etc.

Additionally, the control module 102 may temporarily flicker (e.g., adjust, etc.) the light intensity of the headlights 118, 120 based a confidence value of the detected VRU. For example, the control module 102 and/or the detection module 104 may determine a confidence value associated with the detected VRU. The confidence value may be an assigned value indicating a level of confidence that the detected VRU is in fact a VRU rather than a non-user (e.g., an object such as a bush, a tree, a rock, a road sign, a mailbox, a post, etc.). In various embodiments, the detection module 104 may include a neural network having deep learning and/or machine learning capabilities for assigning confidence values.

For example, the detection module 104 may include an infrared device (e.g., a long wavelength infrared device, etc.) as explained above. In such examples, the infrared device detects an object (e.g., an VRU, an inanimate object, etc.) based on heat from that object. When an object (e.g., a person, an animal, etc.) is moving, a higher amount of heat is generated and detected by the infrared device than when an object (e.g., a bush, a mailbox, etc.) is stationary. In turn, the assigned confidence value may be set or adjusted depending on the amount of detected heat.

Additionally, in some examples, the confidence value may depend on the distance between the moving vehicle and the detected object. For example, as the detection module 104 becomes closer to the object (e.g., due to the moving vehicle), the detection module may become more accurate and confident. As such, the confidence value may change (e.g., decrease or increase) as the distance between the detection module 104 and the object decreases. However, in such examples, the available reaction time of the driver also decreases as this distance (e.g., a distance to break) decreases.

Then, the control module 102 may temporarily flicker the light intensity of the headlights 118, 120 only if the determined confidence value is above a confidence threshold. In other words, the control module 102 may maintain the light intensity if the determined confidence value below the confidence threshold. In such examples, the confidence threshold may be a percentage, such as 80% confidence that the detected object is a VRU, 70% confidence that the detected object is a VRU, 60% confidence that the detected object is a VRU, etc.

Further, in various embodiments, the confidence threshold and/or any other thresholds herein (e.g., the visibility threshold, the velocity threshold, etc.) may be adjusted as desired. For example, the control module 102 may receive data indicative of a likelihood of animal presence. Such data may include, for example, the location of the road (e.g., rural, in a city, etc.), the time of day, the season (e.g., fall, etc.), and/or other data indicative of animal presence or the movement of animals. For instance, deer may be more likely to move in rural areas during the evening hours (e.g., between 6 pm and 9 pm) and during a rutting season which typically occurs in the fall in the United States. As such, when such conditions exist, deer are more likely to cross and/or be near roads. Further, in some examples, the control module 102 may receive data from a database indicative of a frequency of VRUs in the area based on past VRU detections.

Any one of the thresholds may be adjusted based on the received data. For example, if the vehicle is traveling on a rural road in the fall and between 6 pm and 9 pm, the confidence threshold may be decreased, thereby providing a higher sensitivity of the system 100. If, however, the vehicle is traveling on a city road in the fall and between 6 pm and 9 pm, the confidence threshold may be increased, thereby providing a lower sensitivity of the system 100.

In various embodiments, the control module 102 may activate additional alerts in the vehicle to warn the driver of the location of the detected VRU relative to the vehicle. For example, the control module 102 may activate an audible alert through a driver side speaker when a VRU is detected on the driver side of the vehicle or a passenger side speaker when a VRU is detected on the passenger side of the vehicle. Additionally and/or alternatively, the control module 102 may activate a haptic alert that the driver can sense. For example, a particular side of the steering wheel or a particular side a seat may vibrate when a VRU is detected, thereby alerting the driver of the detected VRU, Further, another visual alert by causing a display to provide a directional indicator (e.g., a flashing light, an arrow, etc.), lowering or flickering an ambient light on the driver or passenger side within the vehicle, etc. In some examples, the displayed visual alert may be provided on the windshield (e.g., a head-up display, etc.), on a display of an entertainment center adjacent to the driver, etc.

FIGS. 3-6 illustrate example control processes 300, 400, 500, 600 employable by the control module 102 and the detection module 104 of FIG. 1 for detecting and warning drivers in vehicles of VRUs. Although the example control processes 300, 400, 500, 600 are described in relation to the system 100 of FIG. 1 including the control module 102 and the detection module 104, any one of the control processes 300, 400, 500, 600 may be employable by any suitable system. In the example of FIGS. 3-6, the control processes 300, 400, 500, 600 may start when the system 100, the control module 102, etc. is powered-on and/or at another suitable time.

Figure 3:
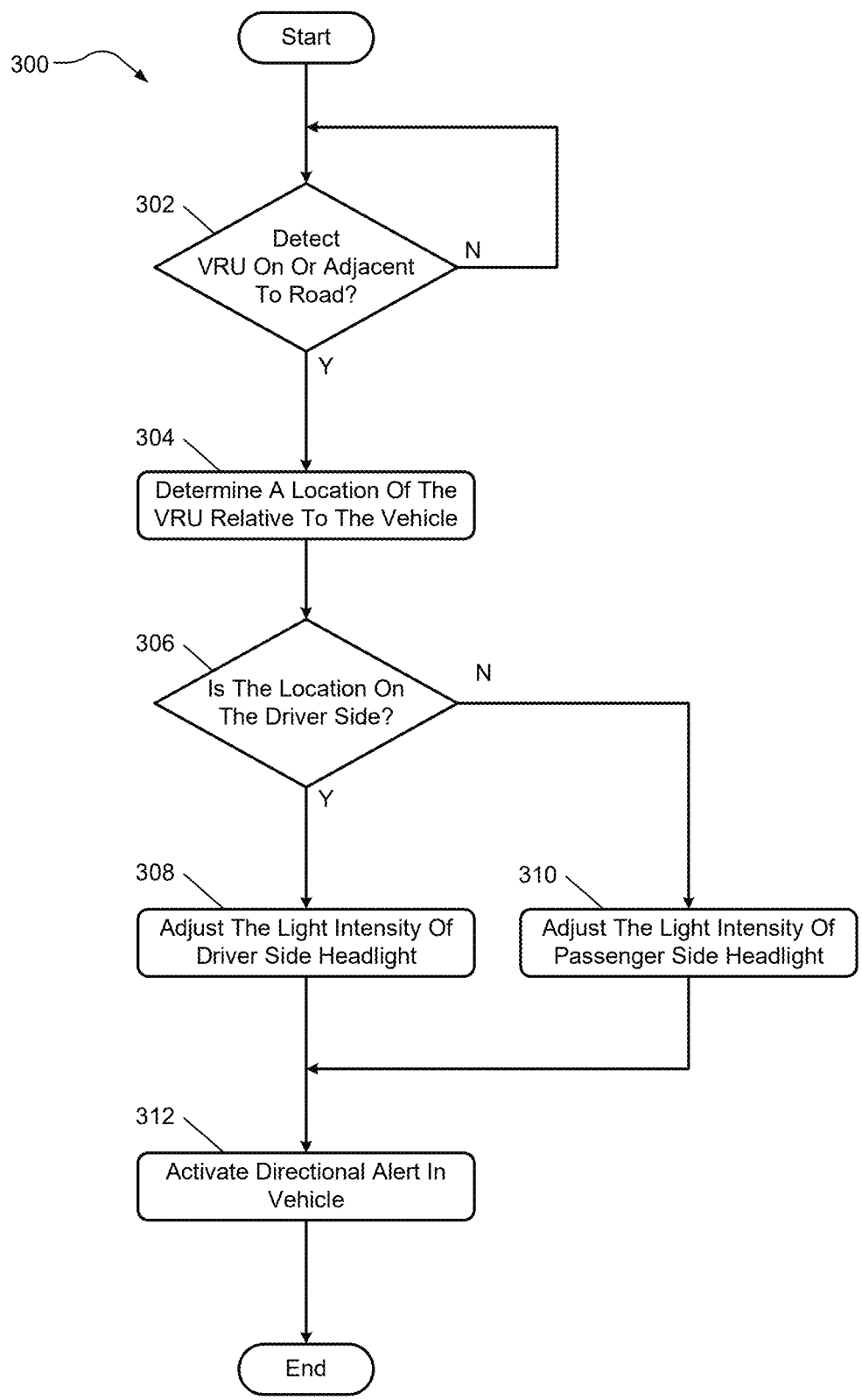
FIG. 3 is a flowchart of an example control process for detecting and warning a driver of a vulnerable road user according to the present disclosure.

As shown in FIG. 3, control begins at 302 where a determination is made as to whether a VRU is detected on or adjacent to a road. For example, the control module 102 may receive data indicative of a detected VRU from the detection module 104 as explained above relative to FIGS. 1-2. In such examples, the detection module 104 may include at least one sensor, such as a long wavelength infrared device, for detecting the VRU. If a VRU is not detected by the detection module 104 and/or the control module 102 does not receive data indicative of a detected VRU, control may return to 302 as shown in FIG. 3 If, however, a VRU is detected by the detection module 104 and/or the control module 102 does receive data indicative of a detected VRU at 302, control proceeds to 304.

At 304, the control module 102 identifies a location of the detected VRU relative to the vehicle based on the data from the detection module 104. For example, the location of the detected VRU may be determined based on an angle of the reflected waves from the VRU received by the detection module 104 relative to the vehicle. In various embodiments, the determined location may be a driver side of the vehicle or a passenger side of the vehicle. Control then proceeds to 306.

At 306, the control module 102 determines whether the location of the detected VRU is on the driver side of the vehicle. If yes, control proceeds to 308 where the control module 102 temporarily flickers (e.g., adjusts, etc.) the light intensity from a driver side headlight (e.g., the driver side headlight 118 of FIG. 1). If no at 306, control proceeds to 310 where the control module 102 temporarily flickers (e.g., adjusts, etc.) the light intensity from a passenger side headlight (e.g., the passenger side headlight 120 of FIG. 1). In some examples, the adjustment of light intensity may be controlled by interrupting power to one of the headlights thereby causing the light intensity of the headlight to temporarily decrease. In various embodiments, the light intensity of both headlights (e.g., the driver and passenger side headlights 118, 120) may be adjusted if, for example, the detected VRU is located in a middle region of a road lane the vehicle traveling along as explained above In such examples, the driver side headlight and the passenger side headlight may be high beam headlights, low beam headlights, fog lights, light bars, etc. For example, the control module 102 may determine whether the high beam headlights are engaged and if so, control the driver side and/or passenger side high beam headlights to flicker or otherwise reduce light intensity. In other examples, the control module 102 may control the driver side and/or passenger side low beam headlights (or other suitable lights) to flicker or otherwise reduce light intensity if the high beam headlights are not engaged.

After the control module 102 adjusts the light intensity of the driver side headlight and/or passenger side headlight, control proceeds to 312. At 312, the control module 102 may optionally activate a directional alert in the vehicle as explained above. For example, the control module 102 may activate another visual alert by causing a display to provide a directional indicator, lowering or flickering an ambient light on the driver or passenger side within the vehicle, etc., a haptic alert through a steering wheel, a seat, etc., and/or an audible alert through a speaker (e.g., a driver side speaker or a passenger side speaker) in the vehicle. In various embodiments, the optionally activation of the directional alert may occur after adjusting the light intensity of the driver side headlight and/or passenger side headlight (as shown in FIG. 3) or simultaneously if desired. Control may then end as shown in FIG. 3 or return to 302 if desired.

Figure 4:
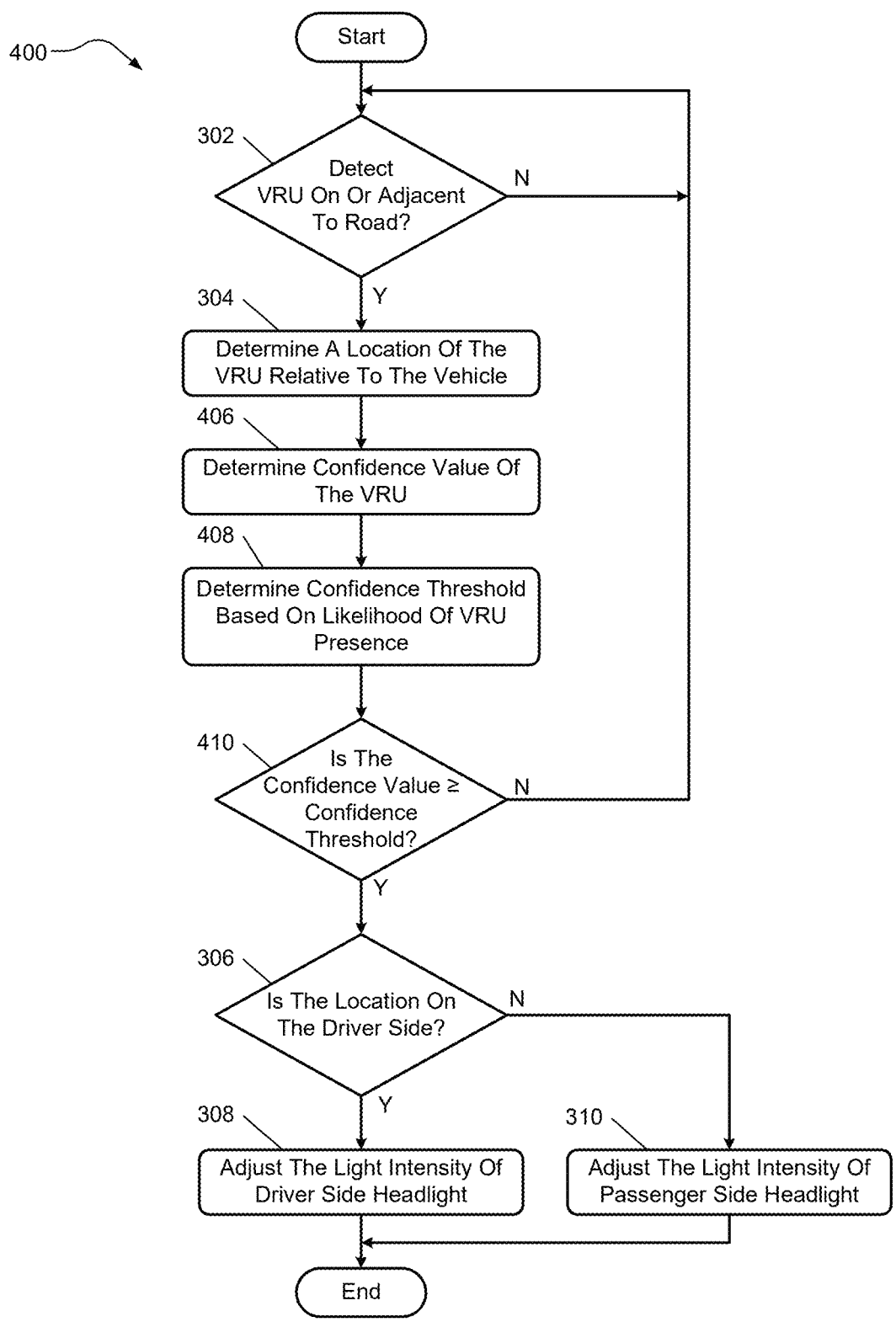
FIG. 4 is a flowchart of another example control process for detecting and warning a driver of a vulnerable road user according to the present disclosure.

As shown in FIG. 4, control begins at 302 where a determination is made as to whether a VRU is detected on or adjacent to a road as explained above relative to FIGS. 1-3. If a VRU is not detected, control may return to 302. If, however, a VRU is detected, control proceeds to 304 where the control module 102 determines or otherwise identifies a location of the detected VRU relative to the vehicle as explained above relative to FIGS. 1-3. Control then proceeds to 406.

At 406, the control module 102 determines a confidence value associated with the detected VRU. For example, and as explained above, the control module 102 may assign a value (e.g., a percentage, etc.) indicating a level of confidence that the detected VRU is in fact a VRU rather than a non-user (e.g., an object such as a bush, a tree, a rock, a road sign, a mailbox, a post, etc.). The assigned confidence value may be based on, for example, an amount of heat detected by the detection module 104, a distance between the moving vehicle and the detected object, etc. Control then proceeds to 408.

At 408, the control module 102 determines a confidence threshold. For example, the control module 102 may determine and/or adjust the confidence threshold based on a likelihood of a VRU (e.g., an individual, an animal, etc.) presence as explained above. In such examples, the control module 102 may receive data indicative of a likelihood of animal presence, such as the location (e.g., rural, in a city, etc.) of the road the vehicle is traveling on, the time of day, the season (e.g., fall, etc.), etc. Additionally, in some examples, the control module 102 may receive data from a database indicative of a frequency of VRUs in the area based on past VRU detections. In various embodiments, the determination of the confidence threshold may occur before, after or at the same time as the determination of the confidence value. Control then proceeds to 410.

At 410, the control module 102 determines whether the confidence value meets the confidence threshold. For example, the control module 102 may make this determination by comparing the confidence value (and/or another representative value) and the confidence threshold (and/or another representative value). If the confidence value is less than the confidence threshold, control may return to 302 or another suitable step, such as 406 or 408. If, however, the confidence value is greater than or equal to the confidence threshold, control proceeds to 306.

At 306, the control module 102 determines whether the location of the detected VRU is on the driver side of the vehicle as explained above relative to FIGS. 1-3. If yes, control proceeds to 308 where the control module 102 temporarily flickers the light intensity of a driver side headlight (e.g., the driver side headlight 118 of FIG. 1). If no at 306, control proceeds to 310 where the control module 102 temporarily flickers the light intensity of a passenger side headlight (e.g., the passenger side headlight 120 of FIG. 1). Control may then end as shown in FIG. 4 or return to 302 if desired.

Figure 5:
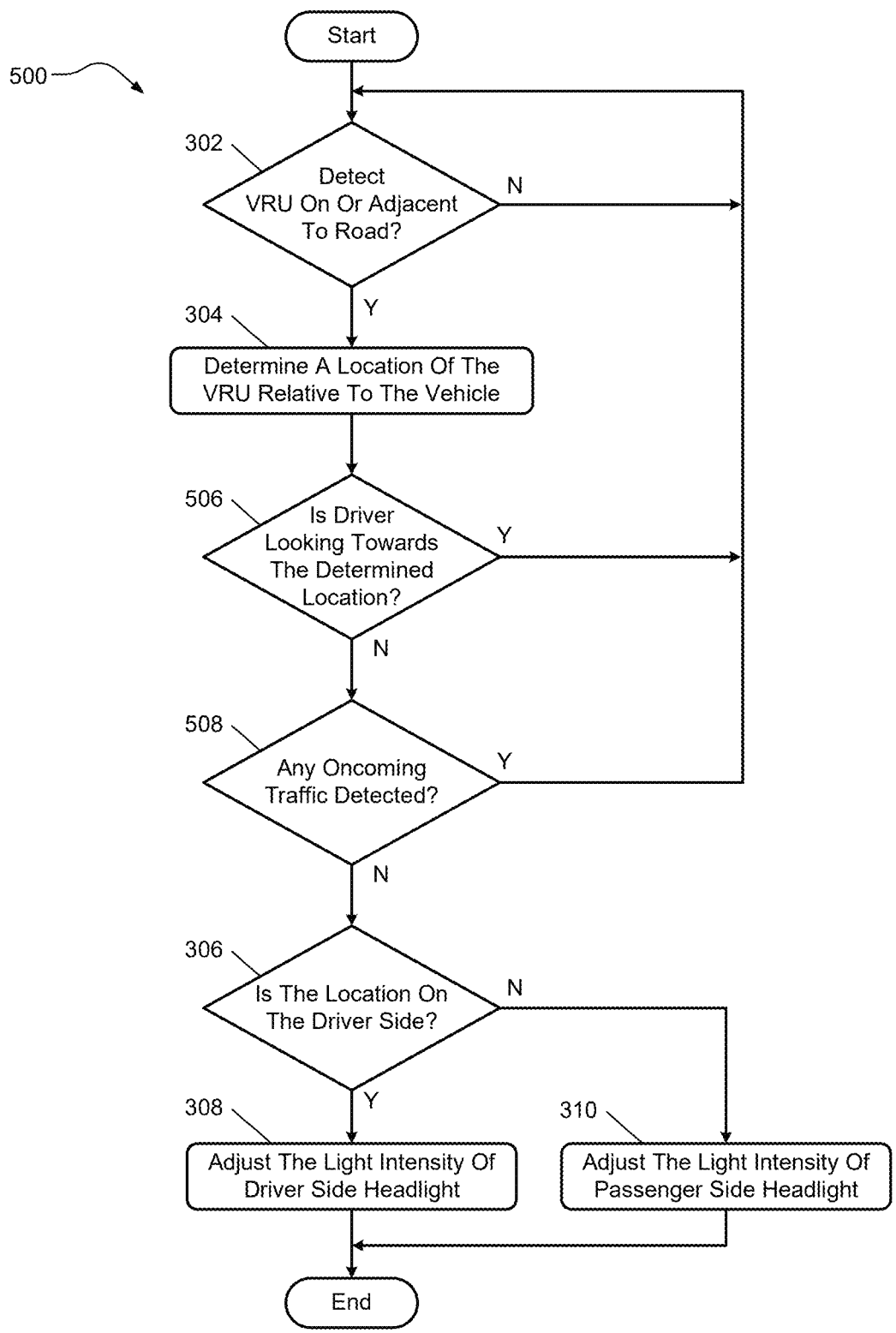
FIG. 5 is a flowchart of another example control process for detecting and warning a driver of a vulnerable road user according to the present disclosure.

As shown in FIG. 5, control begins at 302 where a determination is made as to whether a VRU is detected on or adjacent to a road as explained above relative to FIGS. 1-4. If not, control may return to 302. If yes, control proceeds to 304 where the control module 102 determines or otherwise identifies a location of the detected VRU relative to the vehicle as explained above relative to FIGS. 1-4. Control then proceeds to 506.

At 506, the control module 102 determines whether the driver of the vehicle is looking in the direction of the location of the detected VRU. For example, the control module 102 may detect whether the driver is looking towards the detected VRU based on the captured data from the driver monitoring sensor 110 (e.g., one or more cameras) in the vehicle. If the driver is looking in the direction of the detected VRU, control returns to 302. If, however, the control module 102 does not determine that the driver is looking in the direction of the detected VRU, control proceeds to 508.

At 508, the control module 102 determines whether any oncoming vehicle traffic is detected. In such examples, the control module 102 may receive data from a front camera module (e.g., one of the visibility sensors 112 of FIG. 1) indicating a presence of an oncoming vehicle approaching the vehicle. If an oncoming vehicle is detected, control returns to 302. Otherwise, control proceeds to 306.

At 306, the control module 102 determines whether the location of the detected VRU is on the driver side of the vehicle as explained above relative to FIGS. 1-4. If yes, control proceeds to 308 where the control module 102 temporarily flickers the light intensity of the driver side headlight. If no, control proceeds to 310 where the control module 102 temporarily flickers the light intensity of the passenger side headlight, as explained above. Control may then end as shown in FIG. 5 or return to 302 if desired.

Figure 6:
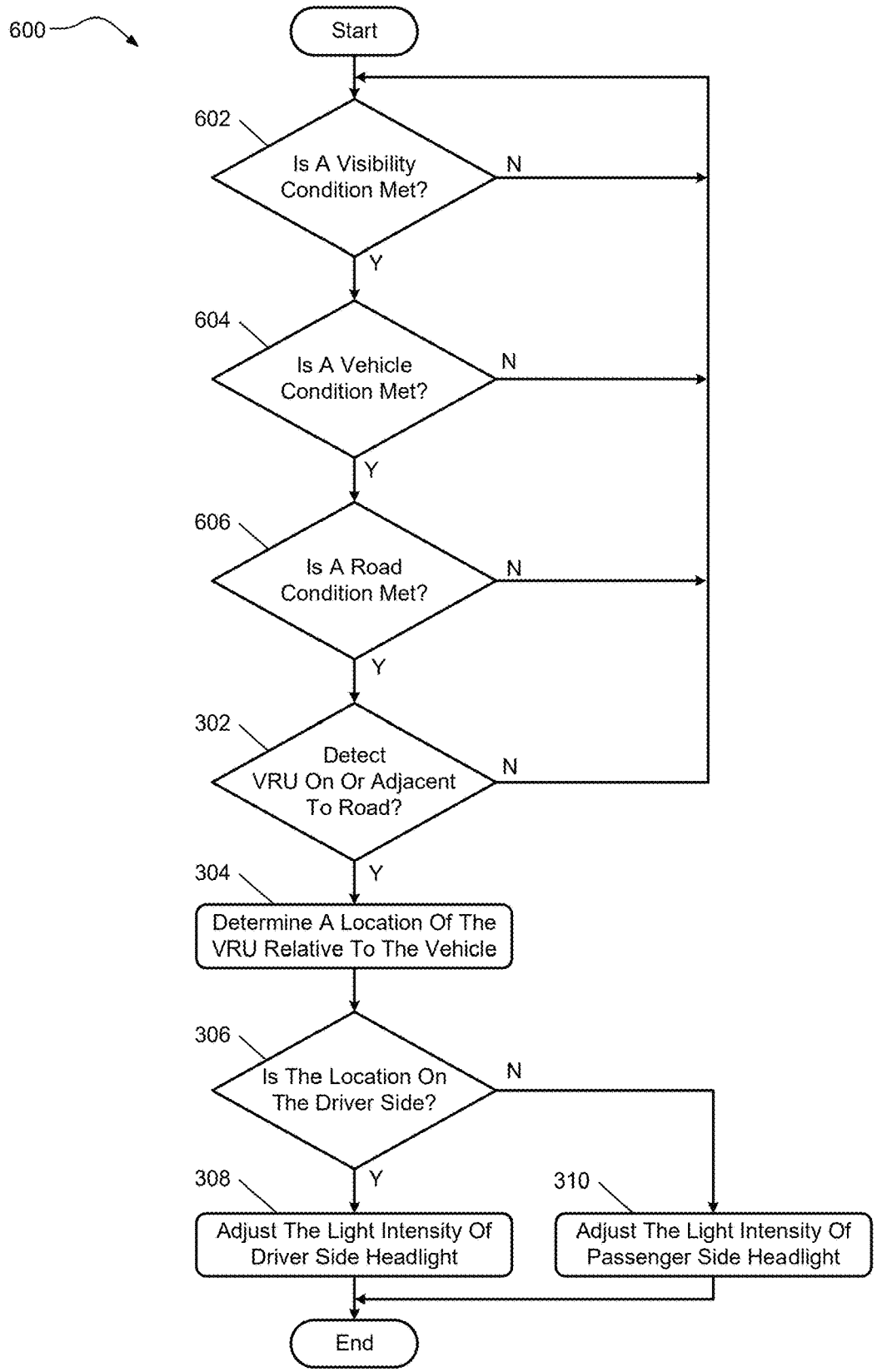
FIG. 6 is a flowchart of another example control process for detecting and warning a driver of a vulnerable road user according to the present disclosure.

As shown in FIG. 6, control begins at 602 where the control module 102 determines whether a visibility condition is met. For example, the control module 102 may receive data from one or more sensors (e.g., the visibility sensor(s) 112 of FIG. 1) indicative of one or more visibility conditions adjacent to the vehicle. For instance, the sensors may include a front camera module and/or another suitable sensor that detects low visibility conditions, such as a presence of smoke, fog, rain, snow, darkness, etc. If any one or more of the low visibility conditions are detected, the control module 102 may determine that the visibility condition is met at 602. In other examples, the control module 102 may assign a value representing the visibility condition adjacent to the vehicle based on the received data. If the assigned value is below a visibility threshold (e.g., indicating a low visibility condition), the control module 102 may determine that the visibility condition is met at 602. Regardless, if the visibility condition is met at 602, control proceeds to 604. Otherwise, control may return to 602 (as shown in FIG. 6), or end if desired.

At 604, the control module 102 determines whether a vehicle condition is met. For instance, the control module 102 may receive velocity data from a velocity sensor (e.g., the velocity sensor 106 of FIG. 1) as explained above. If the vehicle is traveling at a speed greater than a velocity threshold (e.g., 60 kph, 65 kph, 70 kph, 80 kph, 90 kph, etc.), the control module 102 may determine that the vehicle condition is met at 604. Additionally, in some examples, the control module 102 may receive steering wheel rotation data from a steering wheel angle sensor (e.g., the steering wheel angle sensor 108 of FIG. 1) as explained above. In such examples, the control module 102 may determine that the vehicle is being controlled to travel along a relatively straight road (or a portion of the road). If so, the control module 102 may determine that the vehicle condition is met at 604. Regardless, if the vehicle condition is met at 604, control proceeds to 606. Otherwise, control may return to 602 (as shown in FIG. 6), or end if desired.

At 606, the control module 102 determines whether a road condition is met. In such examples, the control module 102 may receive data indicating the type of road (e.g., curvy or straight) the vehicle is traveling along, the location (e.g., rural or in a city) of the road the vehicle is traveling along, etc. Such data may be obtained from, for example, a mapping system (e.g., a GPS, etc.) in communication with the control module 102. If the road is straight and/or in a rural location, the control module 102 may determine that the road condition is met at 606. If so, control proceeds to 302. Otherwise, control may return to 602 (as shown in FIG. 6), or end if desired.

At 306, the control module 102 determines whether the location of the detected VRU is on the driver side as explained above relative to FIGS. 1-5. If yes, control proceeds to 308 where the light intensity of the driver side headlight is temporarily flickered (e.g., adjusted, etc.) as explained above. If no, control proceeds to 310 where the light intensity of the passenger side headlight is temporarily flickered as explained above. Control may then end as shown in FIG. 6 or return to 302 if desired.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for warning a driver in a vehicle of a vulnerable road user (VRU) while the vehicle is moving, the system comprising:
    a detection module including at least one sensor configured to detect VRUs on or adjacent to a road on which the vehicle is moving; and
    a control module in communication with the detection module, the control module configured to:
        receive data indicative of a detected VRU;
        determine a location of the detected VRU relative to the vehicle based on the received data, wherein the location includes a driver side or a passenger side of the vehicle;
        determine a confidence value of the detected VRU; and
        in response to determining the location of the detected VRU, temporarily flicker an intensity of light output from at least one of a first active headlight on the driver side of the vehicle and a second active headlight on the passenger side of the vehicle only if the determined confidence value is greater than a confidence threshold, to warn the driver of the location of the detected VRU relative to the vehicle.

2. The system of claim 1, wherein the at least one sensor includes at least one of a radar, an infrared camera, an infrared sensor, a visible light sensor, and a gated short wave infrared sensor.

3. The system of claim 2, wherein the at least one sensor is configured to detect the VRU beyond a maximum range of the first active headlight and the second active headlight.

4. The system of claim 1, wherein the control module is configured to:
    receive data indicative of an animal presence; and
    adjust the confidence threshold based on the animal presence.

5. The system of claim 1, wherein the control module is configured to:
    detect whether the driver is looking in the direction of the detected VRU; and
    temporarily flicker the intensity of light output from the first active headlight on the driver side or the second active headlight on the passenger side only if the driver is not looking in the direction of the detected VRU.

6. The system of claim 1, wherein the control module is configured to:
    detect whether oncoming vehicle traffic is present; and
    temporarily flicker the intensity of light output from the first active headlight on the driver side or the second active headlight on the passenger side only if no oncoming vehicle traffic is present.

7. The system of claim 1, wherein the control module is configured to:
    receive data indicative of a visibility condition adjacent to the vehicle and a velocity of the vehicle; and
    temporarily flicker the intensity of light output from the first active headlight on the driver side or the second active headlight on the passenger side of the vehicle only if the visibility condition is below a visibility threshold and the velocity of the vehicle is above a velocity threshold.

8. The system of claim 1, wherein the control module is configured to, in response to determining the location of the detected VRU, activate a directional alert in the vehicle to warn the driver of the location of the detected VRU relative to the vehicle.

9. The system of claim 8, wherein the directional alert includes at least one of a visual alert, a haptic alert, and an audible alert.

10. The system of claim 1, wherein the first active headlight and the second active headlight are high beam headlights.

11. A method for warning a driver in a vehicle of a vulnerable road user (VRU), the method comprising:
    detecting, with at least one sensor, a VRU on or adjacent to a road on which the vehicle is moving;
    determining a location of the detected VRU relative to the vehicle, wherein the location includes a driver side or a passenger side of the vehicle;
    determining a confidence value of the detected VRU; and
    in response to determining the location of the detected VRU, temporarily flickering an intensity of light output from at least one of a first active headlight on the driver side of the vehicle and a second active headlight on the passenger side of the vehicle only if the determined confidence value is above a confidence threshold, to warn the driver of the location of the detected VRU relative to the vehicle.

12. The method of claim 11, further comprising:
    receiving data indicative of an animal presence, the data including at least one of the location of the road on which the vehicle is moving, the time of day, and the season of the year; and
    adjusting the confidence threshold based on the animal presence.

13. The method of claim 11, wherein temporarily flickering the intensity of light output includes temporarily flickering the intensity of light output from the first active headlight on the driver side or the second active headlight on the passenger side of the vehicle only if the driver is not looking in the direction of the detected VRU and oncoming vehicle traffic is not detected.

14. The method of claim 13, wherein:
    the method further comprises receiving data indicative of a visibility condition adjacent to the vehicle and a velocity of the vehicle; and
    temporarily flickering the intensity of light output includes temporarily flickering the intensity of light output from the first active headlight on the driver side or the second active headlight on the passenger side only if the visibility condition is below a visibility threshold and the velocity of the vehicle is above a velocity threshold.

15. The method of claim 11, further comprising activating a directional alert in the vehicle to warn the driver of the location of the detected VRU relative to the vehicle in response to determining the location of the detected VRU, wherein the directional alert includes at least one of a visual alert, a haptic alert, and an audible alert.

16. The method of claim 11, wherein the at least one sensor includes at least one of a radar, an infrared camera, an infrared sensor, a visible light sensor, and a gated short wave infrared sensor.

17. The method of claim 11, wherein the first active headlight and the second active headlight are high beam headlights.

18. A system for warning a driver in a vehicle of a vulnerable road user (VRU) while the vehicle is moving on a road, the vehicle including at least one first active headlight on a driver side of the vehicle and at least one second active headlight on a passenger side of the vehicle, the system comprising:
    a detection module including at least one sensor configured to detect VRUs on or adjacent to the road that is beyond a maximum range of the first active headlight and the second active headlight; and
    a control module in communication with the detection module, the control module configured to:
    receive data indicative of a detected VRU;
    receive data indicative of a visibility condition adjacent to the vehicle and a velocity of the vehicle;
    determine a location of the detected VRU relative to the vehicle based on the received data, wherein the location includes a driver side or a passenger side of the vehicle; and
    in response to determining the location of the detected VRU, temporarily flicker an intensity of light output from the first active headlight on the driver side of the vehicle or the second active headlight on the passenger side of the vehicle to warn the driver of the location of the detected VRU relative to the vehicle only if the visibility condition is below a visibility threshold and the velocity of the vehicle is above a velocity threshold.

19. The system of claim 18, wherein the control module is configured to:
    detect whether oncoming vehicle traffic is present; and
    temporarily flicker the intensity of light output from the first active headlight on the driver side or the second active headlight on the passenger side only if no oncoming vehicle traffic is present.

20. The system of claim 18, wherein the control module is configured to, in response to determining the location of the detected VRU, activate a directional alert in the vehicle to warn the driver of the location of the detected VRU relative to the vehicle.

* * * * *